Patented Dec. 7, 1926.

1,610,216

UNITED STATES PATENT OFFICE.

HAROLD WALTER ELLEY, OF WILMINGTON, DELAWARE, ASSIGNOR TO E. I. DU PONT DE NEMOURS & COMPANY, OF WILMINGTON, DELAWARE, A CORPORATION OF DELAWARE.

PRODUCTION OF VULCANIZED RUBBER AND ACCELERATORS THEREFOR.

No Drawing.   Application filed February 25, 1925.   Serial No. 11,590.

This invention relates to the vulcanization of rubber, to a new class of organic accelerators for use in the vulcanization process, and to the rubber compounds obtained by such process.

I have discovered that methylene-bis-aminodithionic acid (that is methylene-bis-dithiocarbamic acid) and its various derivatives—such as its homologues, salts, and anhydrides—constitute, as a class, vulcanization accelerators of an extremely active type. Defining the new accelerators by reference to their molecular structure, it may be said that the molecules of the various specific accelerators have in common the following atomic grouping:

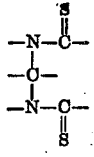

each of the two end carbon atoms being attached to another sulfur atom, as shown in the following graphical partial formulas:

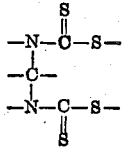   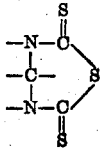

(A)                  (B)

These new accelerators may, for convenience, be divided into various subclasses, as follows:

1. Methylene-bis-aminodithionates of various metals (including zinc and lead) and homologues and derivatives of such salts. Accelerators of this subclass have the following atomic grouping:

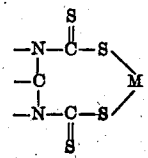

where M stands for a divalent metal such as zinc or lead; or, more generically,

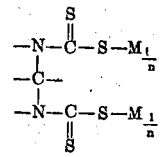

where M represents a metal and $n$ stands for the valence of said metal.

The more valuable accelerators of this subclass have the following general graphical formula:

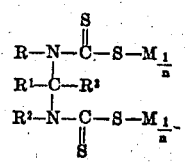

where R and $R^2$ stand for hydrocarbon radicals, and $R^1$ and $R^3$ stand for hydrogen or hydrocarbon radicals.

Examples of accelerators of this subclass are the alkylidene-bis-alkylamino-dithionates such as:

Methylene-bis-methylamino-dithionate of zinc

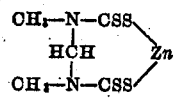

Butylidene-bis-methylamino-dithionate of zinc

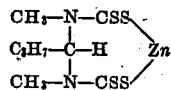

and the alkylidene-bis-aralkylamino-dithionates such as:

Ethylidene-bis-benzylamino-dithionate:

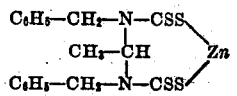

2. Methylene-thiuram-disulfide and its homologues and derivatives, all of which probably contain the following atomic grouping:

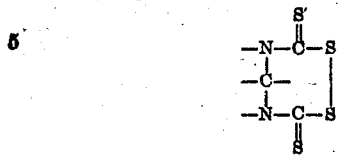

These compounds are readily obtainable from the corresponding sodium dithionates by oxidation in accordance with the following equation:

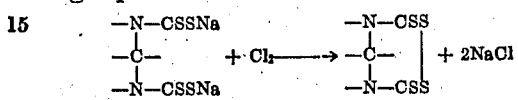

Valuable accelerators of this subclass are the alkylidene-dialkyl (or diaryl)-thiuram-disulfides having the following general graphical formula:

where R and $R^2$ stand for hydrocarbon radicals and $R'$ and $R^3$ stand for hydrogen or hydrocarbon radicals.

Examples of accelerators of this subclass are:
Methylene-dimethyl-thiuram-disulfide,
Ethylidene-dibenzyl-thiuram-disulfide,
Butylidene-diethyl-thiuram-disulfide.

3. Methylene-thiuram-mono-sulfide and its homologues and derivatives, the molecules of which probably contain in common the following atomic grouping:

Valuable accelerators of this subclass are believed to have the following general formula:

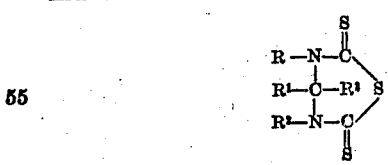

where R and $R^2$ stand for hydrocarbon radicals, and $R'$ and $R^3$ stand for hydrogen or hydrocarbon radicals.

These mono-sulfides may be obtained from the corresponding disulfides described under subclass 2 above by treating the disulfide with an alcoholic solution of potassium cyanide, the reaction apparently proceeding in accordance with the following equation:

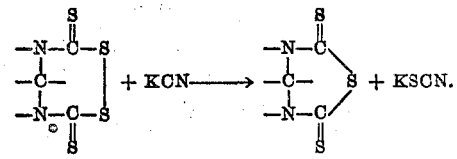

Accelerators of this third group which are particularly valuable are the alkylidene-dialkyl or diaryl-thiuram-monosulfides having most probably the following general graphical formula:

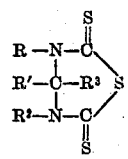

where R and $R^2$ represent hydrocarbon radicals, especially the alkyls, and $R'$ and $R^3$ represent hydrogen or hydrocarbon radicals.

Specific examples of accelerators of this group are:
Propylidene-diethyl-thiuram-monosulfide,
Methylene-dimethyl-thiuram-monosulfide,
Butylidene-dimethyl-thiuram-monosulfide,
Ethylidene-debenzyl-thiuram-monosulfide,
Methylene-diphenyl-thiuram-monosulfide.

It has been known for some time that the salts of dithio-carbamic acid, as well as certain thiuram sulfides (both mono- and disulfides) are accelerators of vulcanization at milling temperatures, but their use for this purpose has been greatly restricted because many rubber stocks containing such accelerators cannot be conveniently handled without excessive scorching. The new accelerators which I have discovered and described above, however, although extremely active, are free from the objection above mentioned. While my accelerators are able to effect vulcanization at temperatures above 100° C., they, nevertheless cause practically no scorching as a result of milling. Moreover, these new types of accelerators not only give efficient cures at a temperature corresponding to five pounds steam pressure, but also show excellent accelerating power at the usual vulcanization temperatures, that is, corresponding to forty pounds steam pressure. The great accelerating power of my accelerators throughout a remarkably wide range of curing temperatures, and the exceedingly slight tendency to scorch during milling renders these accelerators of great importance commercially.

The vulcanized rubber obtained by my process possesses remarkably high tensile strength, resistance to tear, elasticity, and good ageing qualities. My accelerators do not discolor the stock, do not give an offensive odor to the rubber, and do not give off poisonous fumes during the milling operation.

Alkylidene-bis-mono-alkyl- or aryl-dithiocarbamates, (that is, alkylidene-bis-alkyl or aryl-amino-dithionates which are included in subclass 1 described above) may be produced in several ways; one of the preferred methods may be illustrated by the following example:

*Example I.*

258 parts (by weight) of sodium methyl-dithiocarbamate are suspended or dissolved in 258 parts of water, and the resulting suspension or solution is mixed with 72 parts of normal butyraldehyde dissolved in a miscible solvent such as dilute alcohol. The resulting mixture is maintained at a temperature of from about 70 to 80° C. for about an hour, or until the reaction is substantially completed. At the end of this time the sodium salt of butylidene-bis-methyl-dithiocarbamate may be isolated by concentrating the solution under diminished pressure. However, if it is desired to produce a metal salt of the butylidene-bis-methyl-dithiocarbamate, for use directly as an accelerator, the solution, instead of being concentrated may be treated with the theoretical amount of zinc sulfate, after suitable dilution with water, to convert the sodium salt into the insoluble zinc salt of butylidene-bis-methyl-dithiocarbamate.

In this example the condensation of the butyraldehyde with the sodium methyl-dithiocarbamate probably proceeds in accordance with the following equation:

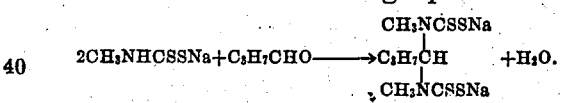

Another method of preparing these alkylidene-bis-alkyl-dithiocarbamates may be illustrated by the following example:

*Example II.*

240 parts of ethylidene-bis-benzylamine are treated with about 152 parts of carbon disulfide and 80 parts of sodium hydroxide, the reaction probably proceeding in accordance with the following equation:

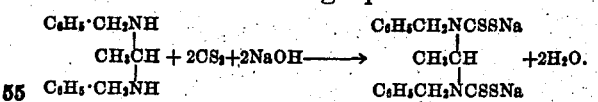

The sodium salt formed may be isolated by evaporation of the solution, or it may be converted into the zinc salt by the addition of zinc sulfate.

The alkylidene-dialkyl- or diaryl-thiuram-disulfides may be obtained from the alkali-metal salts of the corresponding alkylidene-bis-alkyl- or aryl-dithiocarbamic acids by treating a cold solution of the latter with a halogen, for example, chlorine.

The alkylidene-dialkyl- or diaryl-thiuram-mono-sulfides may be produced from the corresponding disulfides by a process analogous to that heretofore known, that is, by treating the disulfides with potassium cyanide in alcoholic solution, as shown in Ber. 36, (1903) page 2275.

Although, in the above description, the examples emphasize the importance of the alkylidene-bis-alkyldithiocarbamates and the corresponding thiuram disulfides and monosulfides, our invention includes equally the alkylidene-bis-aryldithiocarbamates such as:

Butylidene-bis-o-tolyl-dithiocarbamates;
and the corresponding aryl-thiuram sulfides such as:

Butylidene-di-o-tolyl-thiuram disulfide, and

Butylidene-di-o-tolyl-thiuram monosulfide.

In using the above described accelerators, combined zinc—preferably in the form of zinc oxide—is advantageously incorporated in the rubber mix along with sulfur and accelerator. Typical cures may be illustrated by the following examples:

| | Parts. |
|---|---|
| Smoked sheet | 50 |
| Amber crepe | 50 |
| Zinc oxide | 6 |
| Sulfur | 6 |
| Zinc butylidene-bis-methyl-dithiocarbamate | 1 |

The material is placed in a mold and heated with steam at 5 pounds pressure (about 105° C.) for 30 minutes when vulcanization is completed. The vulcanized product had a tensile strength of 4,215 pounds and 780% elongation.

In another example I used the same composition of stock but with methylene-di-methyl-thiuram-disulfide (0.75 part instead of 1 part).

When cured at 20 pounds steam pressure (about 125° C.) for 20 minutes the vulcanized product possessed a tensile strength of 4,065 pounds and an elongation of 700%.

Although in the above description the invention has been illustrated by specific examples mentioning certain specific accelerators, it will be understood that my invention is not in any way limited to these specific examples, but includes broadly alkylidene-dithiocarbamates of metals, particularly divalent metals, such as zinc, lead, copper, mercury, manganese, etc.; and includes also substances having the generic formulas given above and containing in place of the specific alkylidene, aryl, and alkyl radicals, hereinbefore mentioned, various other analogous radicals.

I claim:

1. A process of vulcanizing rubber which comprises combining with the rubber a vulcanizing agent and an alkylidene-bis-alkyl-dithiocarbamate of a metal and subjecting the mixture to a vulcanizing temperature.

2. A process of vulcanizing rubber which comprises combining with the rubber a vulcanizing agent and an methylene-bis-dithiocarbamic acid derivative and subjecting the mixture to a vulcanizing temperature.

3. A process of vulcanizing rubber which comprises combining with the rubber a vulcanizing agent and an alkylidene-bis-dithiocarbamic acid derivative and subjecting the mixture to a vulcanizing temperature.

4. A process of vulcanizing rubber which comprises combining with the rubber a vulcanizing agent and an alkylidene-bis-dialkyl-dithiocarbamate of a divalent metal and subjecting the mixture to a vulcanizing temperature.

5. A vulcanized rubber obtainable by subjecting to a vulcanizing temperature a mixture of rubber, a vulcanizing agent, and an accelerator whose molecules contain the following atomic grouping:

—C(:S)—N—C—N—C(:S)— each of the two end carbon atoms being attached to another sulfur atom.

6. A process of vulcanizing rubber which comprises combining with the rubber an accelerator whose molecules contain the following atomic grouping:

—C(:S)—N—C—N—C(:S)— each of the two end carbon atoms being attached to another sulfur atom, and a vulcanizing agent in the presence of combined zinc, and vulcanizing the rubber.

7. A process of vulcanizing rubber which comprises mixing with the rubber a vulcanizing agent, combined zinc and an accelerator having a molecular structure indicated by the following general formula:

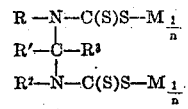

where R and $R^2$ stand for hydrocarbon radicals, R' and $R^3$ stand for hydrogen or hydrocarbon radicals, M represents a metal, and $n$ the valence of said metal; and subjecting the resulting mixture to a vulcanizing temperature.

8. A vulcanized rubber obtainable by the process defined in claim 6.

9. A vulcanized rubber obtainable by the process defined in claim 7.

10. A vulcanized rubber obtainable by the process defined in claim 1.

11. A process of vulcanizing rubber which comprises mixing with the rubber a vulcanizing agent, combined zinc and an accelerator whose molecules contain the following general atomic grouping:

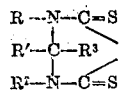

where R and $R^2$ represent hydrocarbon radicals containing from 1 to 7 carbon atoms, R' represents a hydrogen or a hydrocarbon radical containing from 1 to 4 carbon atoms, and $R^3$ represents a hydrogen or hydrocarbon radical containing from 1 to 4 carbon atoms, each of the end carbon atoms which are shown in the above grouping as being bound to sulfur atoms being attached to another sulfur atom; and subjecting the resulting mixture to a vulcanizing temperature.

In testimony whereof I affix my signature.

HAROLD WALTER ELLEY.